United States Patent [19]

Romagnolo

[11] 4,044,439
[45] Aug. 30, 1977

[54] CUTTING PLATE WITH CHIP BREAKERS
[75] Inventor: Gerard Romagnolo, Eybens, France
[73] Assignee: Ugine Carbone, Grenoble, France
[21] Appl. No.: 707,857
[22] Filed: July 22, 1976

Related U.S. Application Data
[63] Continuation-in-part of Ser. No. 578,821, May 19, 1975, abandoned.

[30] Foreign Application Priority Data
June 14, 1974 France .................................. 74.20644

[51] Int. Cl.² ............................................. B26D 1/00
[52] U.S. Cl. ............................................. 29/95 R
[58] Field of Search ............................... 29/95 R, 96

[56] References Cited
U.S. PATENT DOCUMENTS

| | | | |
|---|---|---|---|
| 3,137,917 | 6/1964 | Dowd | 29/95 R |
| 3,395,434 | 8/1968 | Wirfelt | 29/95 R |
| 3,751,782 | 8/1973 | Fruish | 29/95 R |
| 3,866,282 | 2/1975 | Lundgren | 29/95 R |
| 3,875,663 | 4/1975 | Gustafson et al. | 29/95 R |
| 3,975,809 | 8/1976 | Sorice et al. | 29/95 R |

Primary Examiner—Harrison L. Hinson
Attorney, Agent, or Firm—Dennison, Dennison, Meserole & Pollack

[57] ABSTRACT

A small polygonal shaped cutting plate designed to be secured onto the body of a tool for machining of metal pieces, presenting at least one rectilinear cutting edge, containing a groove assuring unrolling and control of the cutting, as well as a radiating cutting point characterized by the fact that it is composed of:

a. a cutting surface with an essentially pyramidal shape whose generatrices form a constant angle with a base plane Qo containing the cutting edge, and b. an assembly of planes forming another surface called the chip breaker on which the shaving to be broken butts in such a manner that a hollow zone is formed in the radiating cutting point whose lowest point is situated in the bisector plane of the cutting point.

5 Claims, 10 Drawing Figures

CUTTING PLATE WITH CHIP BREAKERS

This application is a continuation-in-part of application Ser. No. 578,821, filed May 19, 1975, now abandoned.

The present invention concerns a new cutting plate with chip breakers preferably made in triangular or quadrangular form, such as a square, rectangle or rhombus, having at least one cutting point, designed to be secured on the body of a tool for the purpose of machining pieces while causing advancement and a preferential removal of the cuttings. More particularly, this invention concerns movable cutting plates of positive or negative form having at least one cutting edge.

By the expression "chip breaker" I mean to define the change of orientation of the cutting surface of the movable plate which enhances the rolling up of the cutting or chip and its breaking.

For a long period of time, those skilled in the art have realized that prior art cutting tools caused lifting of the cuttings, rolling of the same and subsequent breaking off in small fractions which can easily be eliminated from the working surface because at the time of the cutting they roll around the machined piece in a rotational movement, and thereby block in the machine causing serious perturbations of its functioning and risks of injury for personnel. This is why the prior art has used monoblock cutting tools, or a brazed plate, whose chip breaker was achieved by sharpening. But it was difficult be means of this method to give the most effective shape to the chip breaker to obtain a well rolled cut and permit an easy breaking off of the cuttings or chips thus to exactly reproduce the said chip braker by a new sharpening.

It is by virtue of these first inconveniences that the prior art proposed the use of movable cutting plates, generally formed by fritting, which one can move mechanically on the body of the cutting tool. It therefore became possible to study beforehand the new form of the chip breaker for a cutting plate and to guarantee good reproduction.

Numerous types of cutting plates, equipped with chip breakers, have been proposed in the art. Among them, a first type utilizes a plate presenting a chip breaker in the form of a groove running along a cutting edge. But it is apparent that with such a plate it is difficult to achieve finish machining since the chip breaker was arranged for roughing down. Thus, applied to a finishing action such a chip breaker produces long ribbons which interrupt the operation of the machine tool.

To eliminate these well known major drawbacks, a second type of cutting plate was designed which consisted of providing the said plate with a second chip breaker called the secondary chip breaker, completing the action of the aforementioned chip breaker, called the principal chip breaker. The secondary chip breaker is then placed in the cutting angle of the plate and can be formed, for example, by another depression. It is thus seen that the prior art describes a plate with a triangular cut presenting three identical cutting angles with edges, and along these edges are formed the principal chip breakers. In each angle of the body there is a secondary chip breaker constituting a depression in the upper surface of the plate with a greater depth and a smaller width than that of the principal chip breaker.

Even if this latter type of cutting plate represents an improvement in the breaking of the chips of small transverse cross section which form when the cutting depths are relatively small, major drawbacks are revealed in usage.

At first, the principal and secondary chip breakers will cause discontinuity in the active surface therefore involving a functional discontinuity in the formation of the cuttings. Thus, according to the angle of direction at which the cutting plate is utilized, and according to the nature of the materials utilized, there is a zone of ineffectiveness where the torn cutting or chip is no longer acted on totally by one or the other chip breaker. From that time this intermediate zone situated between the chip breakers does not function properly and generates malformed cuttings which risk disturbing the proper functioning of the machine tool. Thus, when such cutting plate is used for roughing down, the cutting is wide and breaks under the action of the principal chip breaker. When it is utilized for finish machining, the cut if effected with a slight depth and the narrow cut produced by the rounded part of the cutting angle is formed and breaks on the secondary chip breaker. But when an intermediate cutting depth is made, the cutting torn away is partially supported on the main chip breaker, the secondary chip breaker playing no role in the formation and guidance of said cutting. The cuttings then tend to be in the form of more or less long ribbons disturbing the normal function of the machine-tool.

Normally when the principal chip breaker forms a positive cutting angle to the movable plate, the point of the cut which is subjected to the strongest thermal and mechanical strains is rendered particularly fragile by the presence of a second depression in the cutting angle which constitutes the secondary chip breaker.

All of the aforementioned drawbacks have caused applicant to perfect a cutting plate presenting a true solution to the difficulties encountered in the prior art.

I have designed a new cuttingplate witha chip braker having a triangular, square, rectangular or rhombic form designed to be attached to the body of a tool presenting at least one rectilinear cutting edge having a groove, assuring proper rolling and control of the cutting as well as a radiating cutting point which is characterized by the fact that it is composed of a cutting surface of essentially pyramidal shape whose generatrices form an angle $\alpha$ constant with the base plane containing the cutting edge; and an assembly of planes forming another surface called the chip breaker on which only the cutting to be fractioned is disposed such that a hollow zone is formed in the radiated cutting point, the lowest point of which is situated in the bisector plane of the cutting point causing preferential advancing of the cutting.

The invention is described hereafter in a detailed manner, with reference to the attached drawings in which.

To facilitate the description, the movable cutting plate will be treated essentially in the zone of the radiated point, understanding that its characteristics concern triangular movable plates as well as quadrangular plates such as squared, rectangular or rhombic.

Figure 1:
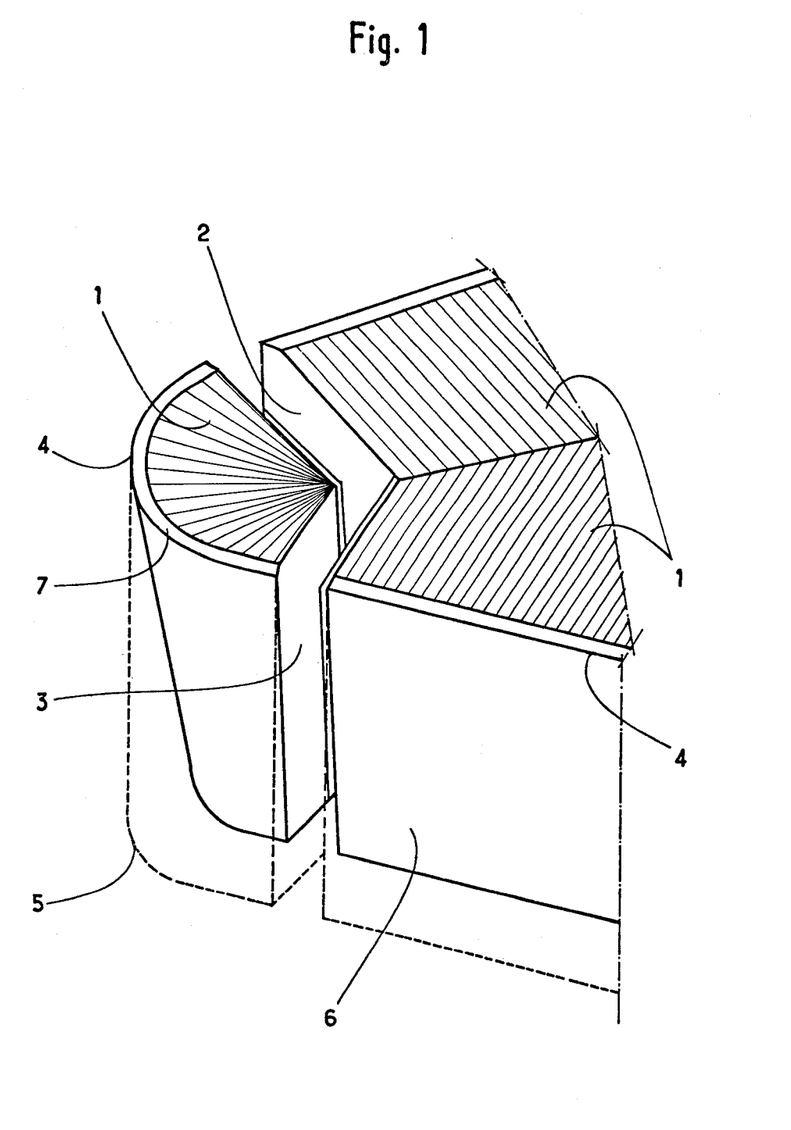
FIG. 1 is an exploded perspective view showing the juxtaposition of the isolated cutting point with the corresponding pyramid.
Figure 2:
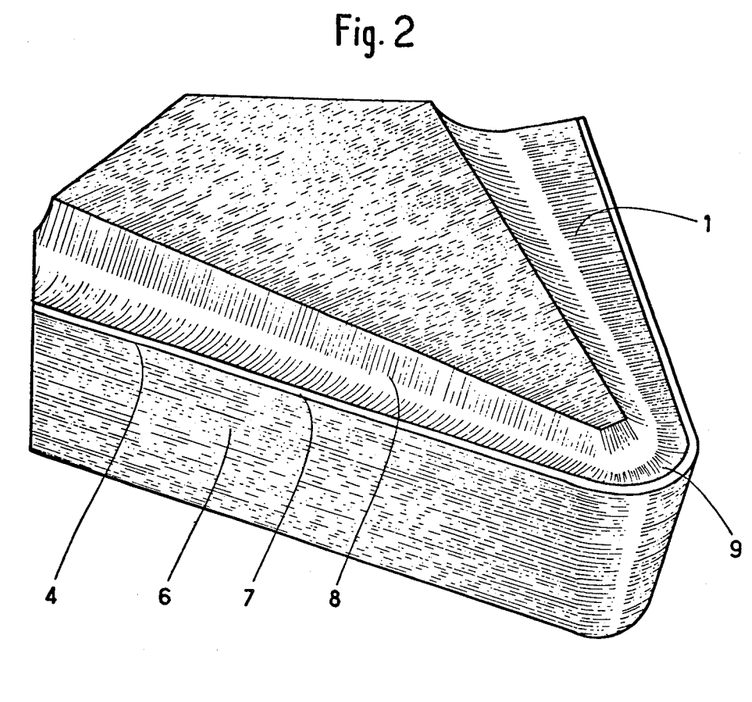
FIG. 2 is a perspective view of the invention.
Figure 3:
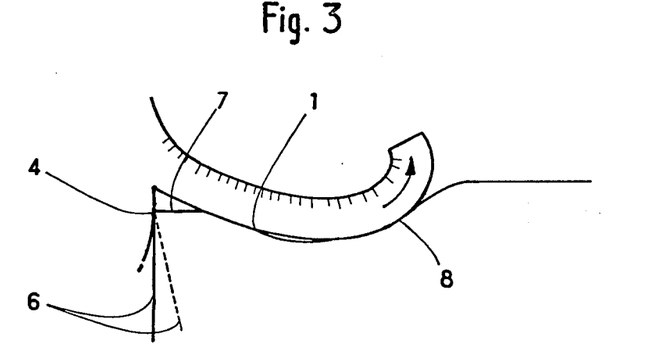
FIG. 3 is a schematic vertical view showing the cutting plate in action.

The movable cutting plate according to the invention, FIGS. 1, 2 and 3, comprises a body 2 having opposed upper and lower faces and at least two sides 6 extending between the upper and lower faces. The sides 6 join each other and form the rounded corner or cutting point 3. It will be seen that the line of joinder of at least a portion of a surface of the upper face with the sides 6 defines a cutting edge of each side 4 and the rounded corner joinder of the sides with at least a portion of the surface of the upper face defines a rounded cutting edge of the cutting point.

In the top face adjacent the cutting edges 4 is a planar surface defining a cutting land, band or listel 7 which reinforces edges 4 and is of a constant width all around the cutting edges. This width is between 0.1 and 0.6 millimeters and preferably between 0.1 and 0.3 millimeters. Toward the central portion of the upper face of the plate is a groove 1 on which the cutting or chip unrolls and which is defined by a downwardly declining cutting surface of the upper face to a rounded fillet and upwardly ascending chip breaker surface 8 from the rounded fillet to the central planar surface that extends above the level of the land 7 and cutting edges 4 to define a centrally located frusto-pyramidal chip breaker island, although it may have a different shape, and the land 7.

Figure 5:
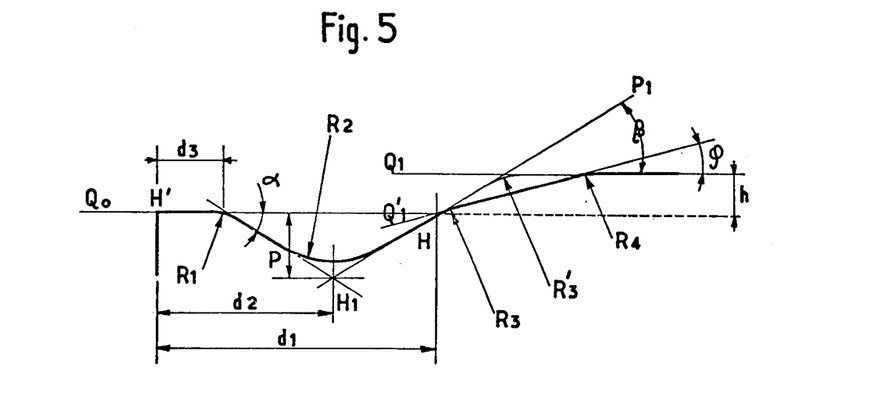
FIG. 5 is a vertical section along the plane passing through the line HH' of FIG. 4.
Figure 6:
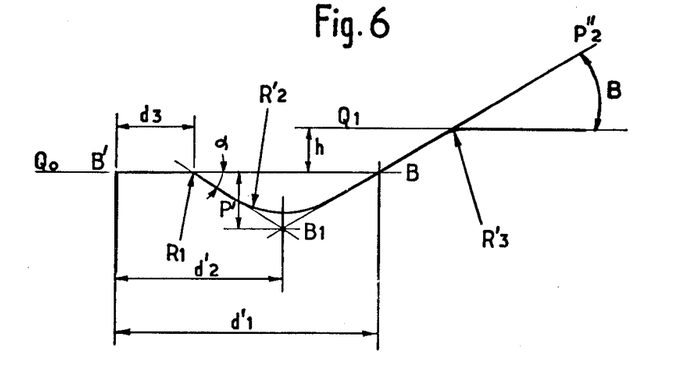
FIG. 6 is a vertical section along the plane passing through line BB' of FIG. 4.

The cutting edges 4 are located in a single plane such as Qo, FIGS. 5 and 6, which is parallel to the support or base plane or upper and lower faces of the plate. The cutting edges 4 and land 7 which are coplanar define a base plane of the frusto-pyramidal chip breaker.

The downwardly declining cutting surface noted above is planar all along the straight portion of the cutting edge and defines a second plane at a first angle α to the defined base plane, and such angle is constant with the base plane Qo. The value of the angle α is generally between 2° and 30°, but is preferably between 5° and 20°.

The ascending surface 8 of one side 6 is planar and defines a third plane at a second angle β and the ascending surface 8 of the other side defines yet a fourth plane. A fifth plane is defined by a further ascending planar surface that is opposed to the rounded corner and which intersects the ascending surfaces of the third and fourth planes. It will be seen that each of the third, fourth and fifth planes intersect the base plane Qo at the same angle.

In cases where the cutting plate offers a symmetrical form on the two faces identified by cutting edges 4 and 5 as shown in phantom lines in FIG. 1, the aforementioned listel 7 can also exist on the second surface reinforcing the cutting edge 5.

Figure 4:
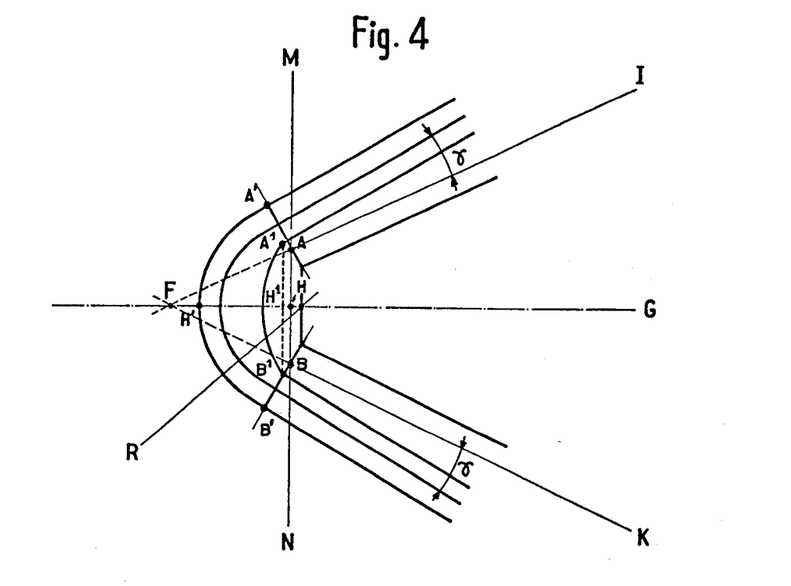
FIG. 4 is a view in descriptive geometry in the horizontal plane of the cutting plate.

To facilitate the description of the chip breaker one of the cutting points of the plate according to the invention has been isolated such as shown in FIGS. 4 through 6.

As will be apparent further herein, a sixth plane is defined that is perpendicular to the base plane Qo along the line that is the bisector of an angle formed by the projected lines of the straight cutting edges wherein the line lies in plane Qo. The rounded nose has a radius whose axis is the point of intersection of the fifth plane, the sixth plane, and the base plane, and whose radial extent is tangent to the terminus of the straight side edges.

The surface of the chip breaker is defined by a plane P1 forming an angle $\beta$ with the plane Qo in the radiated point of the cutting angle, FIG. 5, whose plot on the reference plane Qo is illustrated by straight line MN, FIG. 4, perpendicular to the bisector of the cutting point. The distance from the cutting edge 4 has a length of HH′ = $d1$. In addition, the projection on the reference pane Qo of straight line H1H′ (the point H1 being the intersection of the cutting surface of plane P1 and of the bisector plane of the cutting point), is measured, FIG. 4, by segment H1H′ = $d2$ and moreover must be equal to the line R of the cutting point.

The value of angle $\beta$ mentioned before can vary between wide limits, such as 15° and 90°, but is preferably chosen between 30° and 60°, while the length $d1$ must be between 0.625R and 2R, and can often be equal to R, and $d2$ is preferably between 0.5R and R.

In particular, the inventor has determined that the value of $d2$ depends on the width of land $d3$ and on the radius R and that $d2$ is essentially connected to $d3$ by the relation: $d2 = \frac{1}{8} R + d3$.

Likewise, the said chip breaker surface is limited in the pyramidal assembly 2 by the plane Q1 situated at distance $h$ from Qo, such that $h$ is between 0 and 0.20 mm, and the planes P′2 and P″2, these two latter forming the same angle $\beta$ with the plane Qo, FIG. 6, in which the plots of P′2 and P″2 are represented by the straight lines FI and FK, FIG. 4.

It is the intersection of the third, fourth and fifth planes designated above which are referred to as plots herinafter. The said plots are generally symmetrical with respect to the bisector of the cutting angle and can form an angle $\gamma$ between 0° and 20° with the cutting angle, but preferably between 5° and 15°.

It is in the pyramidal assembly 2 and according to the cut realized in conformity wit line BB′, FIG. 6, where point B contained in the plane Qo is the intersection of the plane P″2 and MN, P1 and P″2 which appear the values of the segment BB′ and of the projection on Qo of B1B′. The values of the segment BB′ is measured by $d′1$ and such that $d′1$ is situated between 0.5R and R. The point B1 being the intersection of the cutting surface with plane p″2 and the cutting plane containing BB′, the projection on plane Qo of B1B′ is measured by the segment $d′2$ and such that $d′2$ is situated between 0.3R and $d2$.

It appears that because of te symmetry which exists with respect to the bisector plane of the cutting point, the values $d″1$ and $d″2$ can be measured by segments AA′ and A1A′.

In another way it is possible to delimit the surface of the chip breaker by a plane Q′1, FIG. 5, forming an angle $\phi$ with the aforementioned plane Q1 and which is perpendicular to the bisector plane of the point radiated from the cut. The angle $\phi$, always less than angle $\beta$, is between 0° and 60°, but preferably between 0° and 30°.

It is evident that for fundamental reasons of manufacture the described surfaces such as in the radiated point 3 as well as in the pyramidal assembly 2 are connected in general by straight lines R1, R2, R'2, R3, R'3, and R4. The radii R1, R3, R'3 and R4 can have a value of zero in the case of sharp edges, and are not limited in the superior values. The radius R2 generally equal to R'2 guarantees the continuity of the cutting surfaces. It is generally between 0.1 millimeter and 1 millimeter, according to the plane of cut AA', but is selected preferably between 0.1 millimeter and 0.6 millimeter.

Finally, the applicant has disposed the planes P1, P'2 and P"2 such that the lengths AA' and BB' are less than HH'. The result is then that the theoretical depth p of the chip breaker at point H1 is greater than the theoretical depth p' (of the same chip breaker at points A1 and B1. It has been noted that the depth) p must be between 0.1R and 0.4R, and that p' must be situated between 0.05R and 0.3R, while the difference between p and p' must always be positive and at least equal to 0.05R.

Consequently, a cut exists in the radiated point, the lowest point of which is situated on a vertical axis passing through point H1 and has the effect of channeling the small dimensions according to one of the generatrixes of the cutting points limited by the plane P1 while effectively fractioning them against the said plane.

Figure 7:
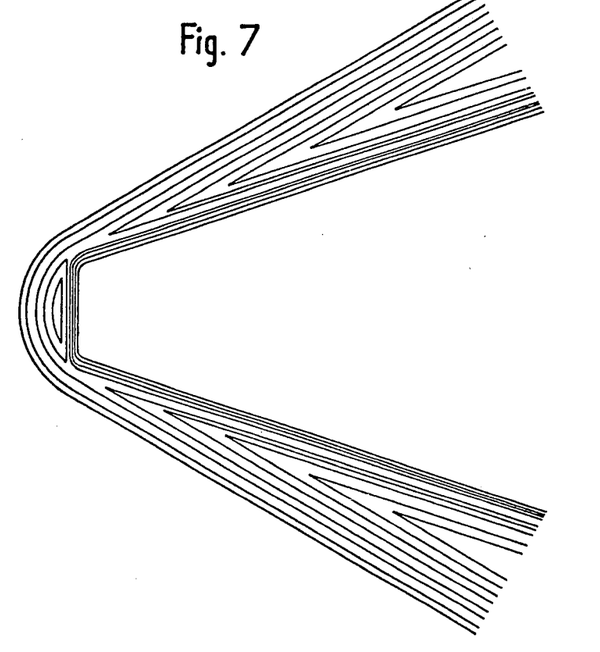
FIG. 7 is a view of the level curves plotted in one of the radiated points of the cutting plate.
Figure 8:
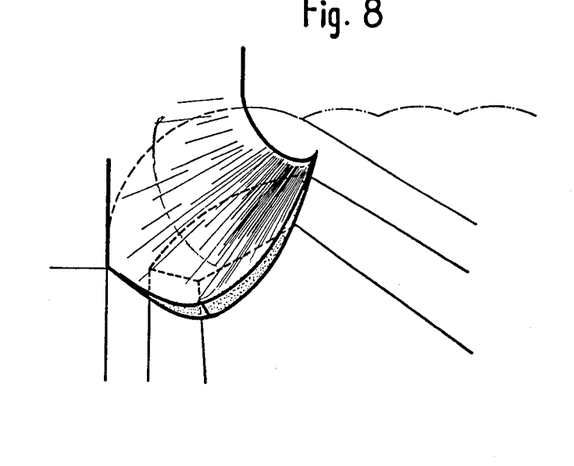
FIGS. 8 and 9 are top views from above the plate at the time of an attack of finishing and roughing down.
Figure 9:
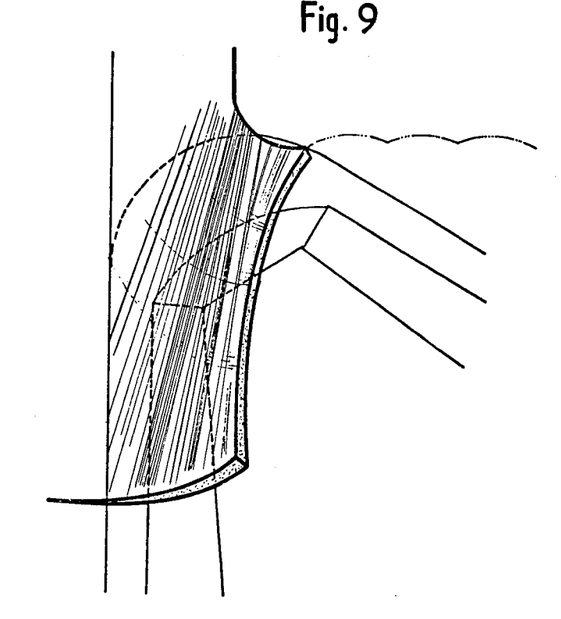
Figure 10:
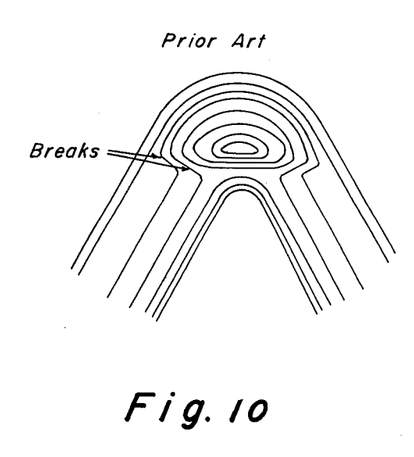
FIG. 10 is a view similar to FIG. 7 but showing the curves of a prior art cutter.

On the other hand, when the cross section of the cuttings becomes greater, the metal torn loose is oriented almost perpendicularly to the cutting edge and the chip breaker then acts in the well known manner. In the latter case, if the angle $\gamma$ converges toward the cutting point, the unrolling of the cutting is facilitated, because p increases when we move away from the cutting point. FIG. 7 clearly illustrates this phenomenon of the evolution of depth p by the assembly of lines with plotted levels of 20 microns in 20 microns. And these lines of levels reveal the surfaces constituting the only chip breaker free of an ineffective zone which operates during roughing down and finishing. Compare this to FIG. 10 which shows a cutting plate of the type in U.S. Pat. No. 3,395,434. A very clear break appears in the contour lines of the prior art plate as contrasted with the homogeneous contour lines of my plate.

It is quite evident that the sides of the cutting plate forming the periphery can be at 90° with relation to the upper and lower surfaces which are parallel to each other. If such a plate is formed, it is then provided with chip breaker surfaces on the two faces. It can be turned again and thus offers twice as many edges than a plate which cannot be turned. If the skin is placed at an angle less than 90° with relation to the upper surface of the cutting plate, the said plate is then designed to be used in a positive tool holder and cannot be turned again. The cutting plate according to the invention is made of hard material, resistant to wear such as for example metal fritted carbides or fritted ceramic material.

EXAMPLE

For roughing down and finishing, I use a cutting plate according to the invention formed as an equilateral triangle with a positive cut, responding to standard I.S.O., TPMR 16038 whose characteristics are as follows:

angle $\alpha = 10°$
angle $\beta = 45°$
angle $\gamma = 10°$
angle $\phi = 0°$
length HH' = d1 = 0.8 mm
length AA' = BB" = d'1 = 0.5 mm
length H1H' = d2 = 0.6 mm
length B1B' = d2 = 0.4 mm
width of the land = d3 = 0.1 mm
distance between the planes Q1 and Qo $h = 0.05$ mm.

| | |
|---|---|
| radius of the cutting point | R = 0.8 mm |
| | R1 = 0.1 mm |
| connecting radii of the surface of the cut and the surface of the chip breaker | R2 = R'2 = 0.3 mm |
| | R3 = 0 |
| | R'3 = 0.15 mm |
| | R4 = 0 |
| depth of the depression according to cut HH' | p = 0.17R = 0.136 mm |
| depth of the depression according to cut BB' | p' = 0.1 mm |

The piece to be machined was made of steel type SC45 f, the plate in gradation P20 (Code I.S.O.), the speed of the cut being 120 m/min. The machining consisted of an exterior cutting down on a parallel turn.

Conforming to standard ISO.TC.29 - 913F "small tools", the form of the cutting was studied as a function of the depth of the pass and the advance of the cut. The cuttings which were collected presented the base characteristics recognized in the art since they have typical forms: flat spiral, conical spiral, tubular short, and short conical helicoidal.

The results were summarized in the following table which in most cases represent the characteristic excellent zones of the cuttings obtained, while the cases marked with an asterisk specify the rare cases where the cuttings present less than good characteristics.

| Advance | | | | | | | | | |
|---|---|---|---|---|---|---|---|---|---|
| 0.5 | 2-2 | 5-2 | 5-2 | 5-2 | 5-2 | 5-2 | 5-2 | 5-2* | * |
| 0.4 | 2-2 | 5-2 | 5-2 | 5-2 | 5-2 | 5-2 | 5-2 | 5-2 | 5-2* |
| 0.3 | 2-2 | 3-1 | 5-2 | 5-2 | 5-2 | 5-2 | 5-2 | 5-2 | 5-2 |
| 0.25 | 3-2 | 3-1 | 5-2 | 5-2 | 5-2 | 5-2 | 5-2 | 5-2 | 5-2 |
| 0.2 | 3-2 | 3-1 | 3-1 | 5-2 | 5-2 | 5-2 | 5-2 | 5-2 | 5-2 |
| 0.15 | 3-2 | 3-2 | 2-2 | 3-1 | 3-1 | 5-2 | 5-2 | 5-2 | 5-2 |
| 0.1 | 5-1* | 3-2 | 2-2 | 2-2 | 2-2 | 5-2 | 2-2 | 2-2 | 2-1* |
| | 0.15 | 0.25 | 0.5 | 1 | 1.5 | 2 | 3.5 | 4.5 | 5.5 |
| | | | | | | | Depth of Pass | | |

I claim:

1. A cutting plate adapted to be connected to the body of a tool for machining metal pieces, said plate having an upper surface having a generally planar face portion, a plurality of planar sides generally normal to said upper generally planar face portion, said sides joining each other in at least a rounded cutting point having a cutting edge at a cutting edge plane which is generally parallel to, and below, the upper generally planar face portion, a chip breaker groove in the upper surface defined by a downwardly inwardly declining first planar surface extending from adjacent the cutting edge to a rounded fillet and then extending upwardly as a chip breaker surface that terminates at a level above said cutting edge plane as a central planar chip breaker island portion of said upper generally planar face portion, said downwardly declining surface being planar all along the cutting edge of the planar sides and conical adjacent the rounded cutting point planes at a first angle constant to said cutting edge plane, said upwardly extending chip breaker surface defining a second angle with said cutting edge plane, which second angle is constant, a lowest point in the rounded fillet being located in a plane normal to the cutting edge plane of the cutting point and bisecting the cutting point and the depth of the fillet at the bisecting plane being greater than the depth of the fillet at a point other than at said bisecting plane.

2. A cutting plate as defined in claim 1, wherein said first angle has a value of between 2° and 30°.

3. A cutting plate according to claim 2 wherein said second angle varies between 15° and 90°.

4. A cutting plate according to claim 1 and further including a planar surface adjacent said cutting edge defining a cutting land of constant width coplanar with said cutting edge.

5. A cutting plate as defined in claim 4 wherein said land has a width of less than 0.6 millimeters.